(12) United States Patent
You

(10) Patent No.: US 8,250,290 B2
(45) Date of Patent: Aug. 21, 2012

(54) SYSTEM AND METHOD FOR MANAGING FILES IN FLASH MEMORY

(75) Inventor: Shan-Ruei You, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 428 days.

(21) Appl. No.: 12/547,663

(22) Filed: Aug. 26, 2009

(65) Prior Publication Data

US 2010/0153627 A1    Jun. 17, 2010

(30) Foreign Application Priority Data

Dec. 17, 2008    (CN) .......................... 2008 1 0306315

(51) Int. Cl.
G06F 12/00   (2006.01)
G06F 17/30   (2006.01)
G06F 12/02   (2006.01)

(52) U.S. Cl. ........... 711/103; 707/E12.01; 707/E12.014; 711/E12.001; 711/E12.008

(58) Field of Classification Search .................. 711/103, 711/E12.001, E12.008; 707/E17.01, 17.014
See application file for complete search history.

(56) References Cited

U.S. PATENT DOCUMENTS

| 5,701,492 A | * | 12/1997 | Wadsworth et al. | .......... 717/173 |
| 2008/0005450 A1 | * | 1/2008 | Bangalore | ...................... 711/103 |
| 2009/0024843 A1 | * | 1/2009 | Choi | ................................. 713/2 |
| 2011/0302359 A1 | * | 12/2011 | Schmidberger | ............... 711/103 |

FOREIGN PATENT DOCUMENTS

| CN | 1632765 A | 6/2005 |
| CN | 1908937 A | 2/2007 |

* cited by examiner

Primary Examiner — Kevin Ellis
Assistant Examiner — Mehdi Namazi
(74) Attorney, Agent, or Firm — Altis Law Group, Inc.

(57) ABSTRACT

A system and method for managing files in a flash memory. The flash memory has a first storage area and a second storage area for storing files. Each of the files has a file header and a data block. The method includes writing the file header of each of the files into the first storage area and setting the first storage area as a first mode, writing the data block of each of the files into the second storage area and setting the second area as a second mode. Responding to the data block of one of the files being completely written into the second storage area, a memory address of the data block stored in the second storage area is written to a corresponding file header.

12 Claims, 4 Drawing Sheets

SYSTEM AND METHOD FOR MANAGING FILES IN FLASH MEMORY

BACKGROUND

1. Technical Field

Embodiments of the present disclosure generally relate to techniques of file management, and more particularly to a system and method for managing files in flash memory.

2. Description of Related Art

A flash memory device is a particular type of non-volatile electrically erasable programmable read-only memory (EEPROM) device that can be electrically erased and reprogrammed. Because of this property, flash memory is widely used in a mobile communication device, and a storing speed can be enhanced. In general, a large number of files are stored in the flash memory, and occupy bulky space, which would seriously effect application efficiency of the flash memory.

What is needed, therefore, is a system and method for managing files in the flash memory, so as to overcome the above-described shortcomings and effectively use storage space of the flash memory.

BRIEF DESCRIPTION OF THE DRAWINGS

FIG. 4 including

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
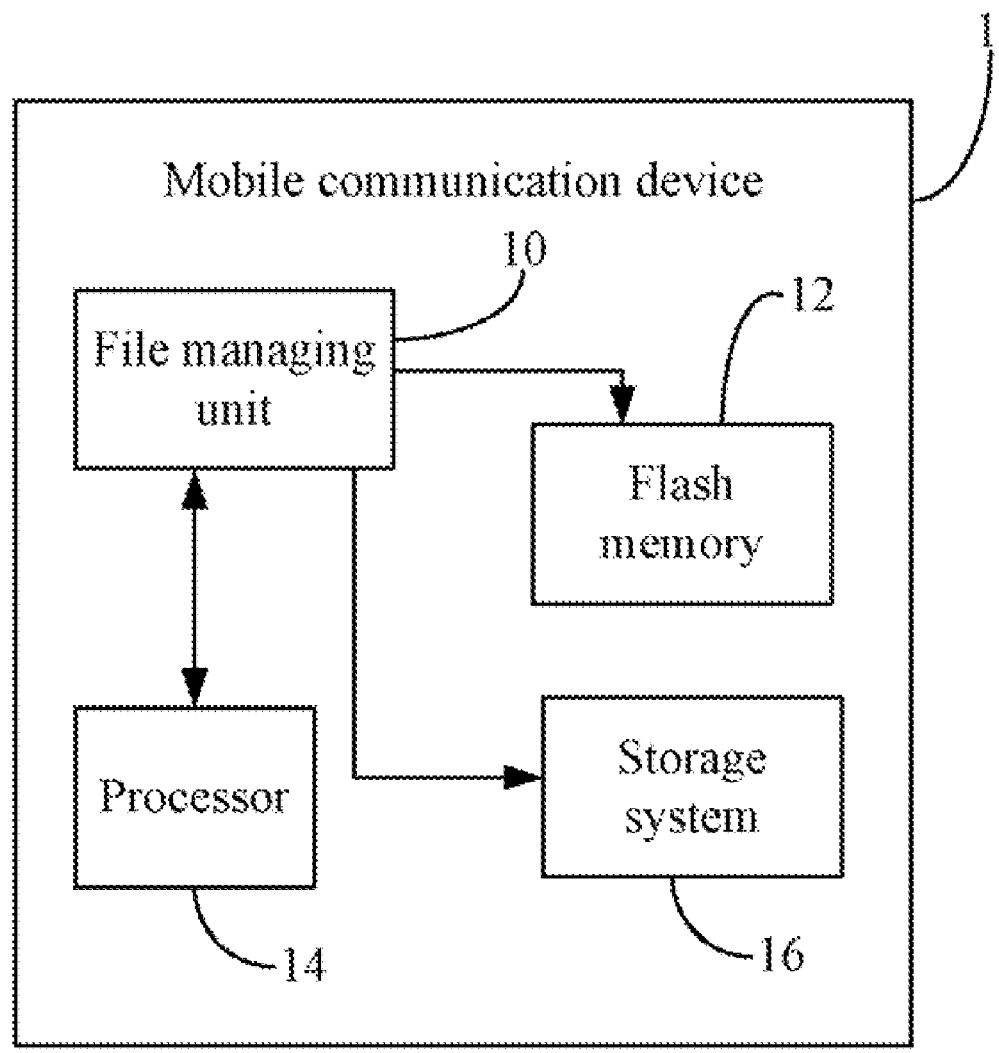
FIG. 1 is a block diagram of one embodiment of a system for managing files in flash memory.

FIG. 1 is a block diagram of one embodiment of a system for managing files in flash memory 12. In one embodiment, the flash memory 12 is installed in a mobile communication device 1, for example, a mobile phone or a personal digital assistant. The mobile communication device 1 typically includes a file managing unit 10, at least one processor 14, and a storage system 16. The file managing unit 10 is operable to partition a storage space of the flash memory 12 into two storage areas, such as a first storage area 120 and a second storage area 122 (as shown in FIG. 4). In the embodiment, each of the files includes a file header and a data block. The file managing unit 10 stores the file header and the data block of each of the files in the first storage area 120 and the second storage area 122 respectively, in order to manage the files effectively. In the embodiment, the file header includes, but not limited to, a file name and a memory address of a corresponding data block stored in the second storage area 122. The file managing unit 10 may be stored in the storage system 16. The storage system 16 may be a hard disk drive, a compact disc, a digital video disc, or a tape drive.

Figure 2:
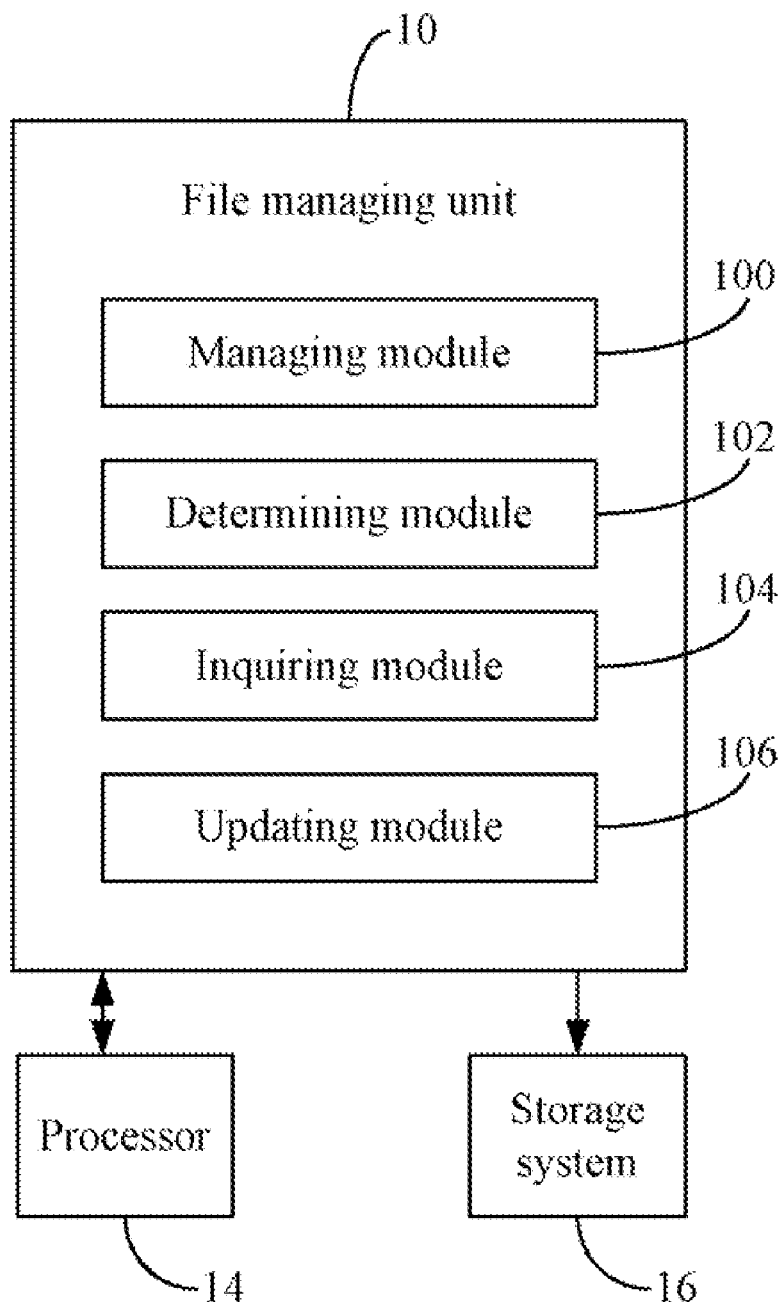
FIG. 2 is a block diagram of one embodiment of function modules of a file managing unit included in the system of FIG. 1.

FIG. 2 is a block diagram of one embodiment of function modules of the file managing unit 10 of FIG. 1. The file managing unit 10 may include a plurality of instructions, and executed by the processor 14 of the mobile communication device 1. In one embodiment, the file managing unit 10 may include a managing module 100, a determining module 102, an inquiring module 104, and an updating module 106.

Figure 4A:
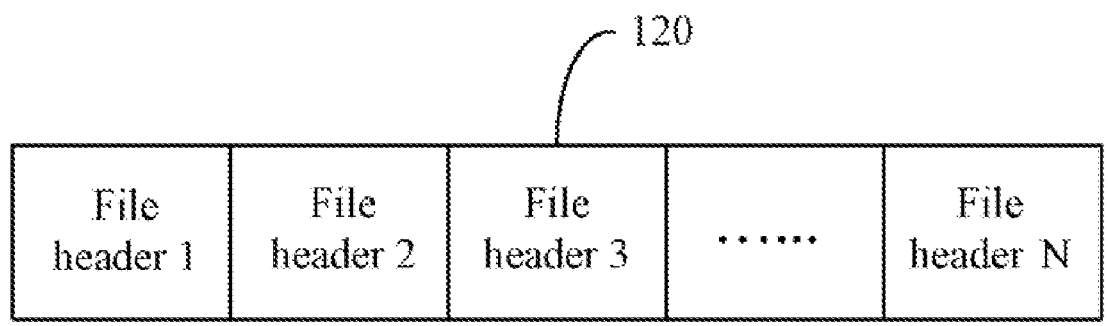
FIG. 4a and FIG. 4b show a schematic diagram illustrating one embodiment of two storage areas of the flash memory.
Figure 4B:
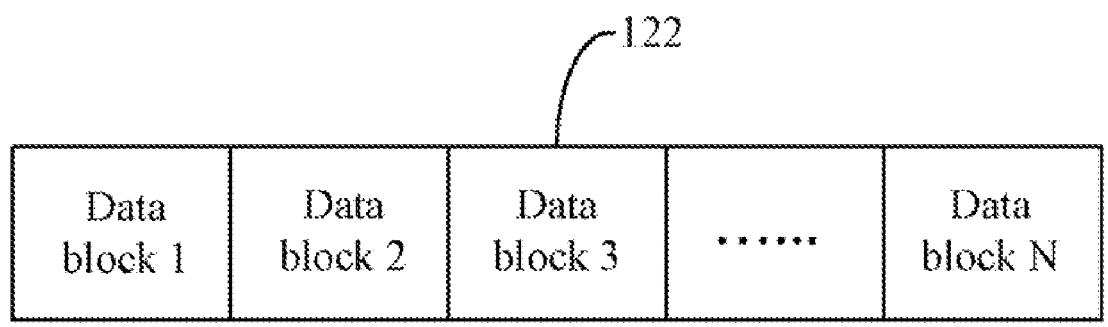

The managing module 100 is operable to write the file header of each of the files into the first storage area 120 of the flash memory 12, and set the first storage area 120 as a first mode. The managing module 100 is further operable to write the data block of each of the files into a second storage area 122 of the flash memory 12, and set the second storage area 122 as a second mode. In the embodiment, the first mode may be a control mode designating that files in the control mode can be edited, and the second mode may be an object mode designating that files in the object mode cannot be edited. The file header of each of the files in the first storage area 120 can be set as a predetermined size (e.g., 128 kilobits), and the file header of all of the files are arranged in the first storage area 120 in a queue. As shown in FIG. 4a, a file header 1, a file header 2, a file header 3, and a file header N are arranged in the first storage area 120. The data block of each of the files in the second storage area 122 represents contents of a corresponding file. The data block of all the files are arranged in the second storage area 122 orderly. As shown in FIG. 4b, a data block 1, a data block 2, a data block 3, and a data block N are arranged in the second storage area 122.

Responding to the managing module 100 have finished writing the data block into the second storage area 122 completely, the managing module 100 is further operable to write a memory address of the new data block of the second storage area 122 into a corresponding file header. For example, if one file includes a file header "a" and a data block "b", the managing module 100 writes the file header "a" to the first storage area 120 of the flash memory 12, and then writes the data block "b" to the second storage area 122. After the data block "b" is completely written in the second storage area 122, the managing module 100 may write a memory address of the data block stored in the second storage area 122 to the file header 1. For example, if the memory address of the data block "b" stored in the second storage area 122 is "x," the managing module 100 may write the memory address "x" to the file header 1.

The determining module 102 is operable to determine whether a control command is received from a user. The control command indicates that a requested file will be read from the flash memory 12 or written into storage areas of the flash memory 12. In the embodiment, the control command at least includes a file name of the requested file.

If the determined module 102 detects the control command, the inquiring module 104 is operable to search the requested file from the first storage area 120 according to the file name of the requested file, and the determining module 102 is further operable to detect whether the first storage area 120 stores a file header of the requested file. If the file header of the requested file is found in the first storage area 120, the inquiring module 104 reads the requested file from the second storage area 122 according to the memory address of the requested file referenced by the file header.

In another embodiment, if the inquiring module 104 detects that contents of the requested file is not new, the updating module 106 is operable to update the requested file in the flash memory 12.

Figure 3:
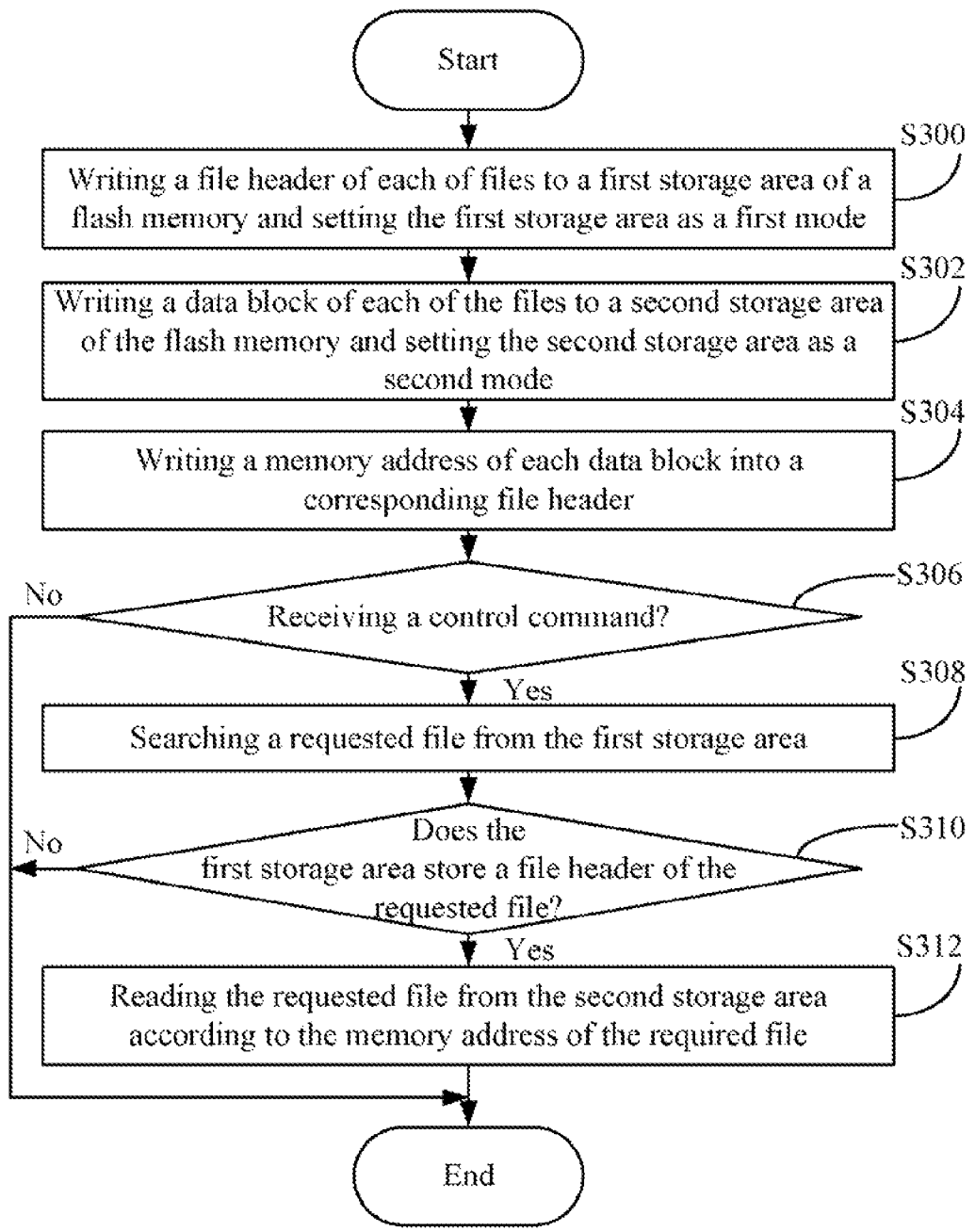
FIG. 3 is a flowchart illustrating one embodiment of a method for managing files in flash memory.

FIG. 3 is a flowchart illustrating one embodiment of a method for managing files in flash memory 12 by using the file managing unit 10 as described in FIG. 1. Depending on the embodiment, additional blocks in the flow of FIG. 3 may be added, others removed, and the ordering of the blocks may be changed.

In block S300, the managing module 100 writes a file header of each of the files into a first storage area 120 of the flash memory 12, and sets the first storage are 120 as a first mode. In the embodiment, the first mode may be a control mode designating that files in the control mode can be edited. The file header of each of the files in the first storage area 120 can be set as a predetermined size (e.g., 128 kilobits), and the file header of all of the files are arranged in the first storage area 120 orderly, as shown in FIG. 4a.

In block S302, the managing module 100 writes a data block of each of the files into a second storage area 122 of the flash memory 12, and sets the second storage area 122 as a second mode. In the embodiment, the second mode may be an object mode, the data clock of all of the files are stored in the second storage area 122 orderly, as shown in FIG. 4b, and each data block in the second storage area 122 has a memory address.

Responding to the managing 100 have finished writing the data block into the second storage area 122 completely, in block S304, the managing module 100 writes a memory address of each data block into a corresponding file header.

In block S306, the determining module 102 detects whether a control command is received from a user. The control command at least includes a file name of a requested file. In the embodiment, if no control command is received, the flow directly ended. Otherwise, if one control command is received, the flow enters block S308 as blow.

In block S308, the inquiring module 104 searches the requested file from the first storage area 120 according to the control command.

In block S310, the determining module 102 detects whether the first storage area 120 stores a file header of the requested file. If the first storage area 120 does not store the file header of the requested file, the flow directly ends.

In response to the first storage area 120 stores the file header of the requested file, in block S312, the inquiring module 104 reads the requested file from the second storage area 122 according to the memory address referenced by the file header.

In another embodiment, if the requested file is not a new file, the updating module 106 can update the requested file in the second storage area 122 of the flash memory 12.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for managing files in a flash memory, the method comprising:
    partitioning the flash memory into a first storage area and a second storage area;
    writing a file header of each of the files to the first storage area, the file headers of all of the files being arranged in the first storage area in a queue;
    setting the first storage area as a first mode, the first mode being a control mode designating that files in the control mode are capable of being edited;
    writing a data block of each of the files to the second storage area, the data blocks of all of the files being arranged in the second storage area according to an order of the file headers arranged in the first storage area;
    setting the second storage area as a second mode, the second mode being an object mode designating that files in the object mode are incapable of being edited; and
    responding to the data block of one of the files being completely written into the second storage area, writing a memory address of the data block stored in the second storage area to a file header corresponding to the file.

2. The method as described in claim 1, wherein the file header at least stores a file name and the memory address of the data block stored in the second storage area.

3. The method as described in claim 1, further comprising:
    searching a requested file in the first storage area according to the file name of the requested file after a control command is received from a user; and
    reading the requested file from the second storage area according to the memory address of the requested file stored in the file header.

4. The method as described in claim 3, wherein the control command at least comprises a file name of the requested file.

5. A storage medium having stored thereon instructions that, when executed by a processor, causing the processor to manage files in a flash memory, wherein the method comprises:
    partitioning the flash memory into a first storage area and a second storage area;
    writing a file header of each of the files to the first storage area, the file headers of all of the files being arranged in the first storage area in a queue;
    setting the first storage area as a first mode, the first mode being a control mode designating that files in the control mode are capable of being edited;
    writing a data block of each of the files to the second storage area, the data blocks of all of the files being arranged in the second storage area according to an order of the file headers arranged in the first storage area;
    setting the second storage area as a second mode, the second mode being an object mode designating that files in the object mode are incapable of being edited; and
    responding to the data block of one of the files being completely written into the second storage area, writing a memory address of the data block stored in the second storage area to a file header corresponding to the file.

6. The storage medium as described in claim 5, wherein the file header at least stores a file name and the memory address of the data block stored in the second storage area.

7. The storage medium as described in claim 6, wherein the method further comprises:
    searching a requested file in the first storage area according to the file name of the requested file after a control command is received from a user; and
    reading the requested file from the second storage area according to the memory address of the requested file stored in the file header.

8. The storage medium as described in claim 7, wherein the control command at least comprises a file name of the requested file.

9. A system for managing files in a flash memory, wherein the flash memory is partitioned into a first storage area and a second storage area for storing files, the system comprising:

a managing module operable to write a file header of each of the files to the first storage area and set the first storage area as a first mode, write the data block of each of the files to the second storage area and set the second storage area as a second mode, and write a memory address of the data block stored in the second storage area to a file header corresponding to the file after the managing module writes the data block to the second storage area completely; and wherein the file headers of all of the files are arranged in the first storage area in a queue, the data blocks of all of the files are arranged in the second storage area according to an order of the file headers arranged in the first storage area, the first mode is a control mode designating that files in the control mode are capable of being edited, and the second mode is an object mode designating that files in the object mode are incapable of being edited.

10. The system as described in claim 9, wherein the file header at least stores a file name and the memory address of the data block stored in the second storage area.

11. The system as described in claim 10, further comprising an inquiring module operable to search a requested file from the first storage area according to the file name of the requested file after a control command is received from a user, and read the requested file from the second storage area according to the memory address referenced by the file header.

12. The system as described in claim 11, wherein the control command at least comprises the file name of the requested file.

* * * * *

UNITED STATES PATENT AND TRADEMARK OFFICE
CERTIFICATE OF CORRECTION

PATENT NO.        : 8,250,290 B2                                          Page 1 of 1
APPLICATION NO.   : 12/547663
DATED             : August 21, 2012
INVENTOR(S)       : You It is certified that error appears in the above-identified patent and that said Letters Patent is hereby corrected as shown below:

On the title page Item [73] should read:

[73]   Chi Mei Communication Systems, Inc., Tu-Cheng, New Taipei (TW)

Signed and Sealed this
Twenty-ninth Day of October, 2013

Teresa Stanek Rea
*Deputy Director of the United States Patent and Trademark Office*